United States Patent [19]

Chen

[11] Patent Number: 5,911,589
[45] Date of Patent: Jun. 15, 1999

[54] MECHANISM OF DRAWER TYPE HARD DISC CONVERTER RACK

[75] Inventor: Den Hsi Chen, Taipei Hsien, Taiwan

[73] Assignee: Lian Li Industrial Co., Ltd., Tapiei Hsien, Taiwan

[21] Appl. No.: 09/001,563

[22] Filed: Dec. 31, 1997

[51] Int. Cl.[6] .................................................. H01R 13/62
[52] U.S. Cl. .......................... 439/296; 361/685; 439/157
[58] Field of Search .................................... 439/296, 310, 439/372, 157; 361/685

[56] References Cited

U.S. PATENT DOCUMENTS 5,563,767  10/1996  Chen ........................................ 361/685
5,767,445   6/1998  Wu .......................................... 361/685
5,797,667   8/1998  Wu .......................................... 361/685

Primary Examiner—Gary Paumen
Assistant Examiner—Antoine Ngandjui
Attorney, Agent, or Firm—Jacobson, Price, Holman & Stern, PLLC

[57] ABSTRACT

The subject invention relates to an improved mechanism of drawer type hard disc converter rack, particularly to one with convenient removal and easy insertion of a drawer hard disc. The technical approach adopted in the subject invention involves such that, when the accommodating box and the fixed seat are combined, the user need only push the round jut on the handle, which has been put in a constantly-open status, into the bottom of the G-groove, and turn down the handle, so the jutting point of the handle is inserted in the dented groove of the fixed seat. In this way, the reactionary force from the jut that is pushing on the closing block will push the accommodating box into the fixed seat, to combine the two connecting ports.

3 Claims, 5 Drawing Sheets

MECHANISM OF DRAWER TYPE HARD DISC CONVERTER RACK

BACKGROUND OF THE INVENTION

The subject invention relates to an improved mechanism of drawer type hard disc converter rack, particularly to one with convenient removal and easy insertion of the drawer type hard disc.

In our draw-type hard disk converter rack (U.S. Pat. No. 5,563,767), the two connecting ports have to be tightly joined in order to ensure the connection between two connecting ports with multiple-point contact; however, there should be allowance between the accommodating box and the fixed rack, the allowance will permit slight displacement between the two connecting ports, such displacement shall result in poor connection between the two connecting ports.

In view of this shortcoming and based on several years of experience in the production and design of drawer type hard disc converter racks, the subject inventor has conducted intensive study in improvement, and has finally presented an improved mechanism that is different from a conventional drawer type hard disc converter rack, and that will improve the shortcomings of the conventional drawer type hard disc converter racks. Hence, this application is filed for the patent right.

SUMMARY OF THE INVENTION

The objective of the subject invention is that: the drawing block of the G-groove will withstand impact when the accommodating box is pushed into the fixed seat and to avoid excessive impact that might cause damage to the connecting ports or the circuit board, and a preset stress is applied by the combined accommodating box and the fixed seat to the spring, to facilitate the removal of the combined accommodating box and fixed seat.

A main feature of the subject invention is a round jut on the handle, designed so that when the accommodating box is pushed into the fixed seat, the round jut slides to the bottom of the G-groove, so the drawing block on the G-groove can withstand the impact applied by the round jut onto the fixed seat. In this way, the fragile connecting ports and the circuit board are not exposed to direct outside impact, so as to avoid the shortcomings of a conventional drawer type of hard disc converter rack where connecting ports and circuit board can be damaged by the outside impact. In the subject invention, there are additional springs on opposite locations of the two supporting arms of the handle and on the handle fixer. Said springs serve to facilitate the removal or insertion process of the accommodating box in the fixed seat. Therefore, the technical approach adopted in the subject invention will be able to achieve the objective of the invention.

To enable better understanding of the main technical approaches, please refer to the following detailed description with drawings;

BRIEF DESCRIPTION OF NUMERALS

| | | | |
|---|---|---|---|
| A | accommodating box | A1 | top cover |
| A2 | connecting port | B | handle |
| C | fixed rack | C1 | connecting port |
| 1 | accommodating box | 11 | connecting port |
| 12 | handle fixer | 121 | screw slot |
| 1211 | catch groove | 2 | handle |
| 21 | supporting arm | 211 | round jut |
| 212 | screw hole | 2121 | depressed groove |
| 213 | jutted point | 3 | fixed seat |
| 31 | connecting port | 32 | arm |
| 321 | G-groove | 3211 | closing block |
| 3212 | drawing block | 322 | dented groove |
| 4 | spring | 41 | wing |

DETAILED DESCRIPTION OF PREFERRED EMBODIMENT

Figure 1:
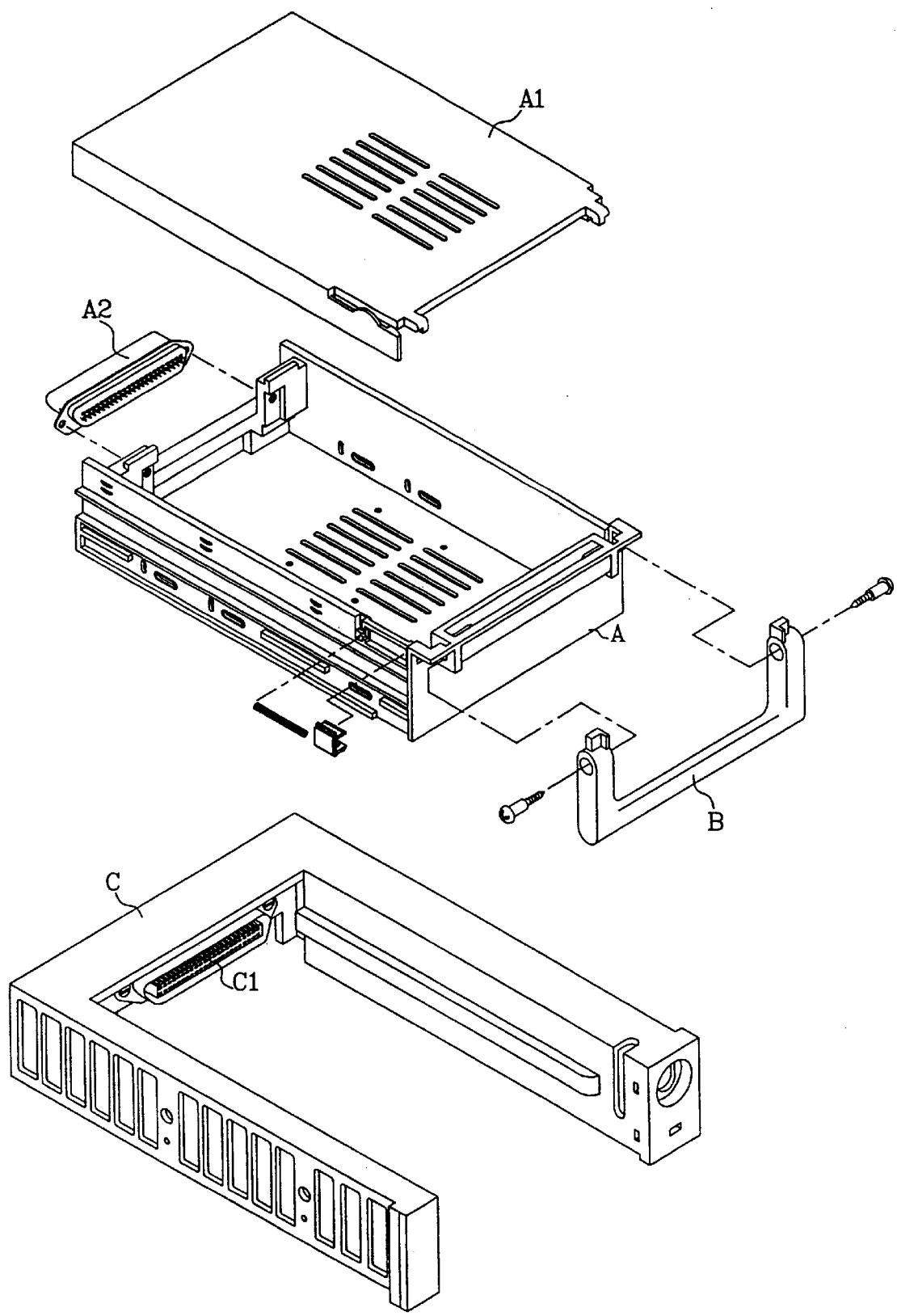
FIG. 1 is an exploded view of a prior art of drawer type hard disc converter rack.

As illustrated in FIG. 1, in the drawer-type hard disc converter rack of U.S. Pat. No. 5,563,767, only the top cover (A1) is placed over the accommodating box (A), while the rotating handle (B) is installed at an appropriate location at the front of the accommodating box (A), when the accommodating box (A) and the fixed rack (C) are joined, the relative movement process between the accommodating box (A) and the fixed rack (C) can be improved, to enable smooth insertion or withdrawal of the accommodating box (A) from the fixed rack (C).

Figure 2:
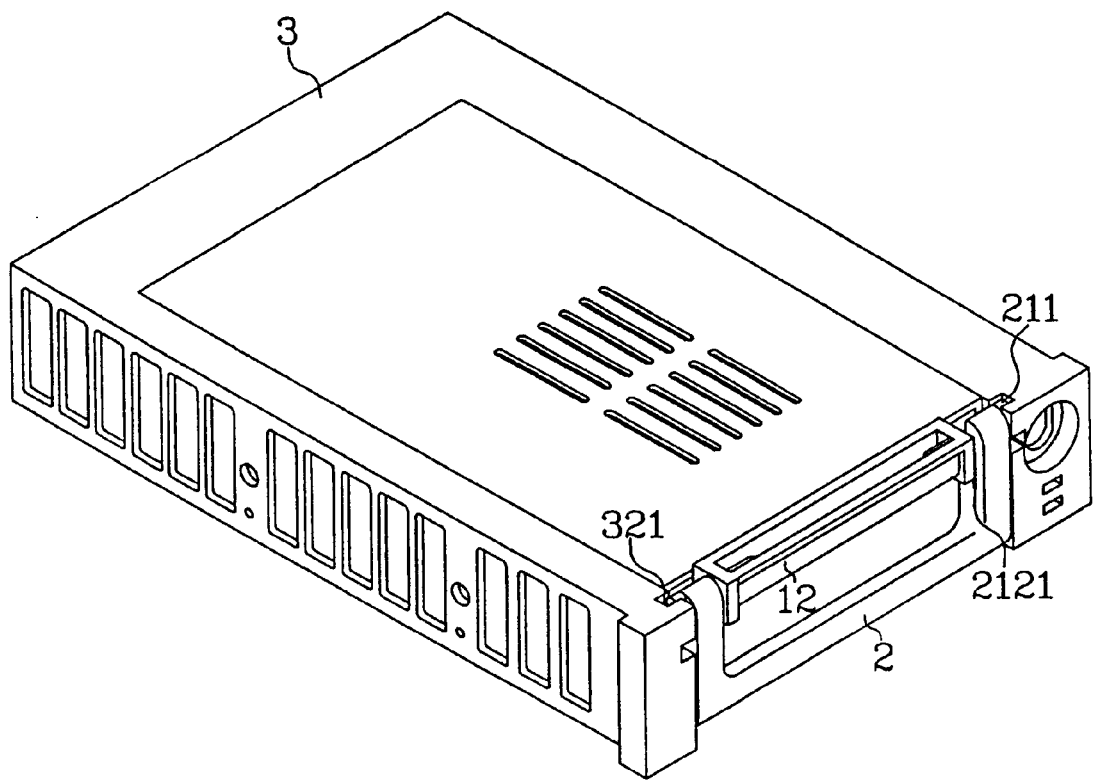
FIG. 2 is a perspective view of the subject invention, with the accommodating box and fixed rack combined.
Figure 3:
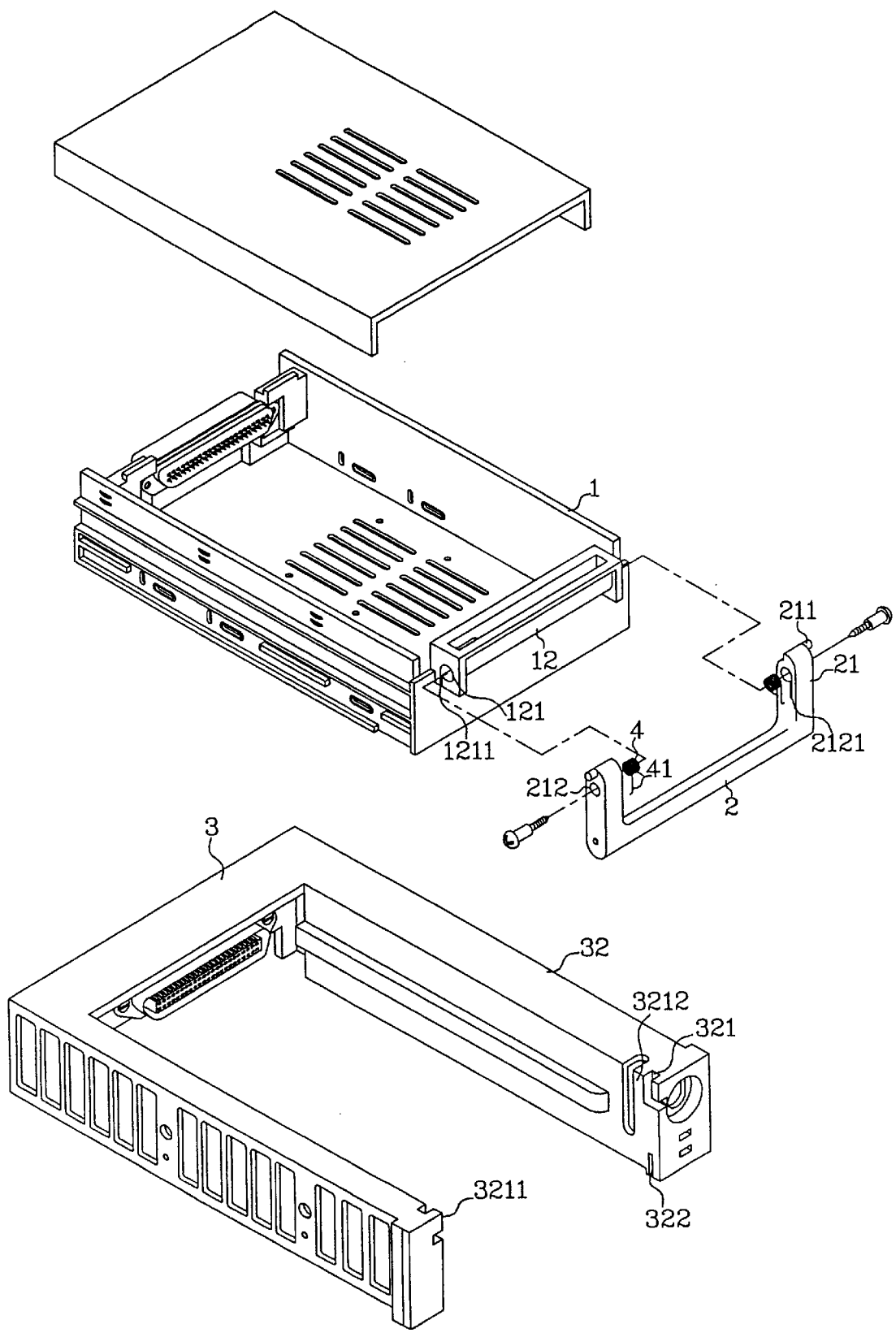
FIG. 3 is an exploded view of the subject invention.

As illustrated in FIGS. 2 and 3, on the handle (2) of the subject invention there are two round juts (211) that protrude outwards, inside each of the two opposite screw holes (212) on the handle (2) is a depressed groove (2121) to accommodate one wing (41) of the spring (4), and on each of the two screw slots (121) on the handle fixer (12) at the front of the accommodating box (1) is a catch groove (1211) to accommodate the other wing (41) of the spring (4). The springs (4) are locked between the handle (2) and the handle fixer (12). On the inside of each of the front ends of the two arms (32) of the fixed seat (3) is a G-groove (321). On the left and right sides of the G-groove (321) is the formation of a closing block (3211) and a drawing block (3212). Below the G-groove (321) inside each arm (32) is a dented groove (322) to clasp the round jut (211) on the handle (2).

Figure 4:
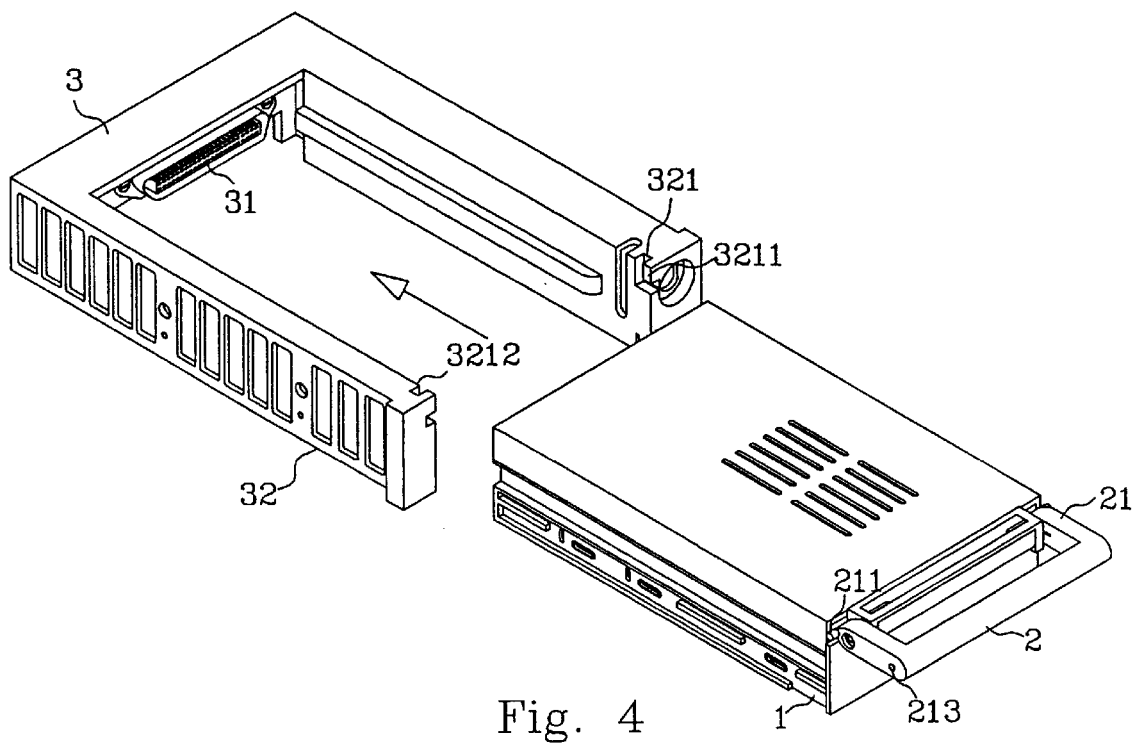
FIG. 4 is a perspective view of the subject invention of accommodating box and fixed rack being assembled (1).
Figure 5:
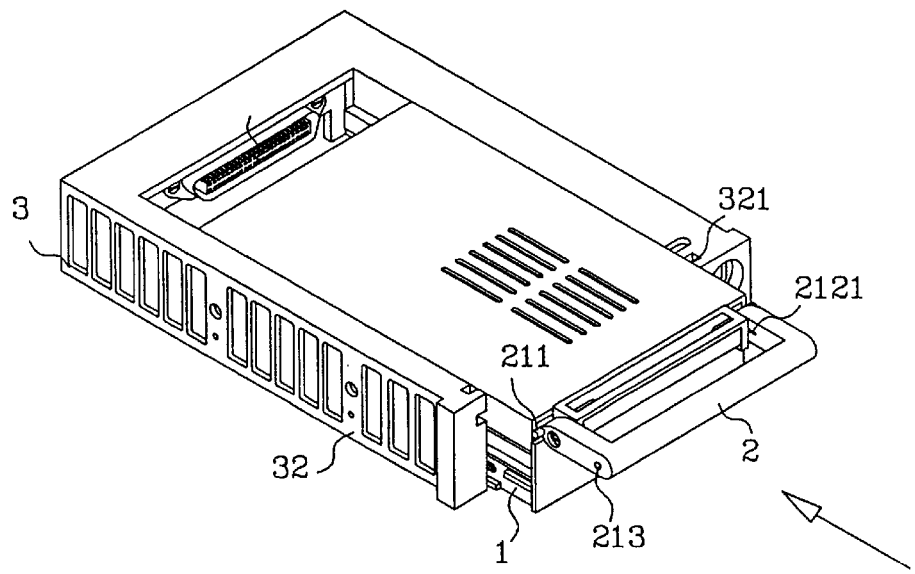
FIG. 5 is a perspective view of the subject invention of accommodating box and fixed rack being assembled (2).

As illustrated in FIGS. 4 and 5, when the accommodating box (1) quickly slides into the fixed seat (3), the round jut (211) on the supporting arm (21) of the handle (2) slides to the bottom of the G-groove (321) and is stopped by the drawing block (3212), so most of the impact is absorbed by the drawing block (3212) and the round jut (211). This will achieve the purpose of protecting the connecting ports (11) (31) and the circuit board thereon.

Figure 6:
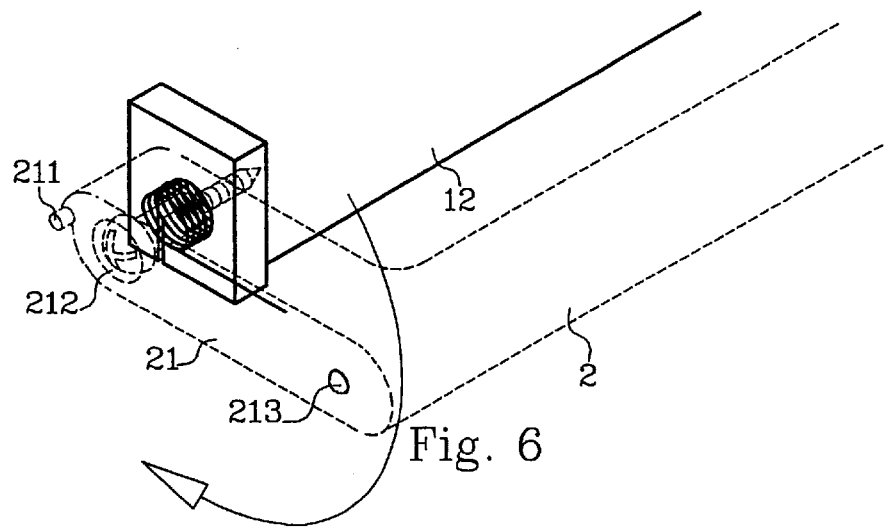
FIG. 6 is an illustration of the subject invention in action (1).
Figure 7:
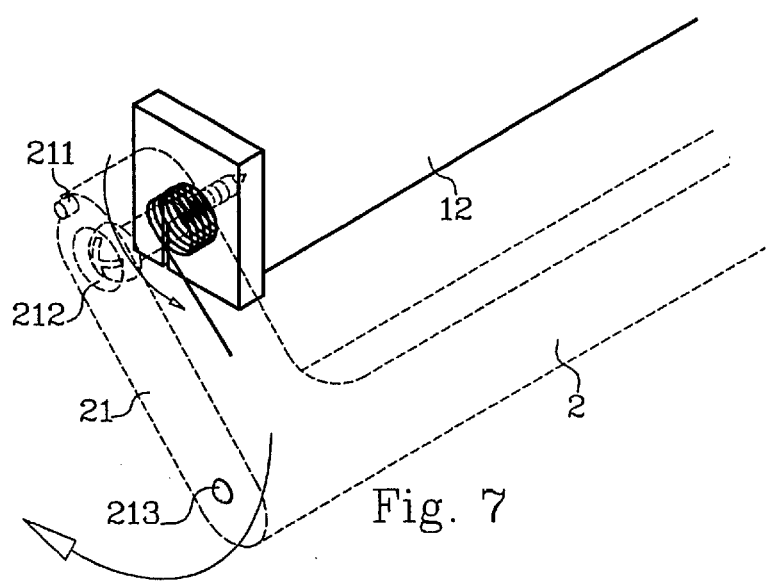
FIG. 7 is an illustration of the subject invention in action (2).
Figure 8:
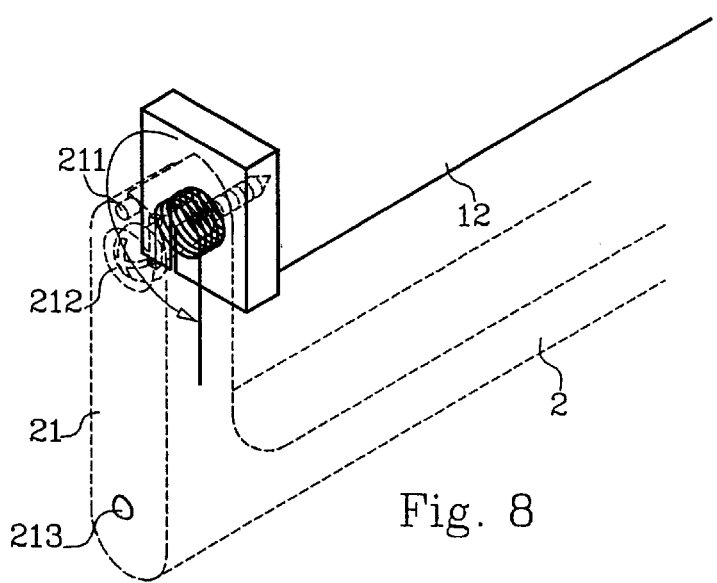
FIG. 8 is an illustration of the subject invention in action (3).

As illustrated in FIGS. 6, 7 and 8, since the two wings (41) of the spring (4) are respectively inserted in the depressed groove (2121) on the handle (2) and the catch groove (1211) on the handle fixer (12), the stretching force of the spring (4) on the handle (2) will keep the handle (2) in a constantly open status [i.e. the handle (2) will always be kept away from the side of the accommodating box (1)]. When the round jut (211) is in contact with the drawing block (3212), the user need only rotate the handle (2) towards the bottom of the accommodating box (1) to pull the accommodating box (1) into the fixed seat (3) by means of the reactionary force of the round jut (211) pushing on the closing block (3211). In this way, the two connecting ports (11) (31) will match, and the jutting points (213) on the handle (2) will be guided into the dented groove (322) on the two arms (32) of the fixed seat (3), and so the handle (2) can be fixed. Conversely, in order to pull the accommodating box (1) out of the fixed seat (3), and since the spring (4) is subjected to preset stress (when the constantly open handle (2) is closed, the spring (4) will be given a reactionary force), the user need only disengage the jutting point (213) on the handle (2) from the dented groove (322). The preset stress on the spring (4) is released to turn the handle (2), and when the handle (2) is turned, the round jut (211) will push the drawing block (3212) to disengage the two connecting ports (11) (31). The accommodating box (1) can then be easily removed.

In the same way, in order to change the included angle between the two wings (41) of the spring or to change the relative locations between the depressed groove (2121) and the catch groove (1211) to switch the handle (2) to a constantly-closed status, the user need only pull open the handle (2) when the catch groove (1211) has entered the fixed seat (3), so that the round jut (211) on the supporting arm (21) slides to the bottom of the G-groove(321). The resilient force of the spring (4) which is deformed by the force applied will then turn the handle (2) and the reactionary force of pushing on the closing block (3211) will pull the accommodating box (1) into the fixed seat (3), and move the jutting point (213) into the dented groove (322). Conversely, the user need only turn the handle (2) to disengage the jutting point (213) from out of the dented groove (322), and push the round jut (211) to slide out of the bottom of the G-groove (321); then, the resilient force of the deformed spring (4) will reset the handle (2) to its constantly-closed status.

Theoretically, the round jut (211) is designed to serve the purpose of sliding in the G-groove (321), to push on the closing block (3211) and to push on the drawing block (3212), so it is of no importance whether it is designed in a round, rectangular or other polygonal shape. In practical application, however, a round shape is recommended to extend its service life, since the wear and tear on a round surface will be evenly distributed, while a rectangular or a polygonal shape's corners will be subject to friction and wear, which will result in deformation of the jutting block and failure of the close combination of the two connecting ports (11) (31).

Summing up, the subject invention, a novelty creation that will achieve its objectives with its practicability and industrial utility, has not yet been openly displayed before the date of application, so it has fully satisfied the qualifications of a patent right, therefore, this application is duly filed to protect the subject inventor's rights and interests. Your favorable consideration shall be appreciated.

It is hereby declared that the above description, covering only the preferred embodiment of the subject invention, should not be used to limit or restrict the subject claim, and that all equivalent structural and/or configurational variations and/or modifications easily conceivable to anyone skilled in the subject art, and deriving from the subject description with drawings herein shall reasonably be included in the intent of the subject claim.

I claim:

1. A drawer type hard disc converter rack comprising:
    an accommodating box having a connecting and a handle fixer, in each screw slot at two ends of the handle fixer there is a catch groove;
    a handle having two juts protruding outwardly and two opposite screw holes each including a depressed groove, and on two supporting arms, jutting points protruding outwardly;
    a fixed seat having a connecting port, and G-grooves and dented grooves on two arms;
    two springs having a wing at an starting end and a terminal end to join the accommodating box and the fixed seat by a user pushing the jut on the handle into a bottom of the G-groove, and turning the handle downward so that the jutting point of the handle is inserted in the dented groove on the fixed seat, and a reactionary force from the jut pushing on the fixed seat forcing the accommodating box into the fixed seat, and joining in the two connecting ports.

2. The drawer type hard disc converter rack, as described in claim 1, wherein the jut is a polygonal jutting piece, with a wear-resistant material pasted onto corners of the polygonal jutting piece.

3. The drawer hard disc converter rack, as described in claim 1, wherein the two juts are round.

* * * * *